US012732874B2

(12) United States Patent
Sun

(10) Patent No.: US 12,732,874 B2
(45) Date of Patent: Sep. 8, 2026

(54) INFORMATION PROCESSING METHOD AND APPARATUS, TERMINAL, AND NETWORK SIDE DEVICE

(71) Applicant: VIVO MOBILE COMMUNICATION CO., LTD., Dongguan (CN)

(72) Inventor: Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 311 days.

(21) Appl. No.: 18/507,054

(22) Filed: Nov. 12, 2023

(65) Prior Publication Data

US 2024/0080723 A1 Mar. 7, 2024

Related U.S. Application Data

(63) Continuation of application No. PCT/CN2022/092496, filed on May 12, 2022.

(30) Foreign Application Priority Data

May 12, 2021 (CN) ........................ 202110518394.X

(51) Int. Cl.
*H04W 36/00* (2009.01)
*G06N 3/045* (2023.01)
(Continued)

(52) U.S. Cl.
CPC ........ *H04W 36/0058* (2018.08); *G06N 3/045* (2023.01); *H04W 12/06* (2013.01); *H04W 36/362* (2023.05); *H04W 64/006* (2013.01)

(58) Field of Classification Search
CPC ..... H04W 64/00; H04W 24/02; H04W 4/029; H04W 24/08; H04W 24/10;
(Continued)

(56) References Cited

U.S. PATENT DOCUMENTS

2019/0219688 A1 7/2019 Liu et al.
2021/0336683 A1* 10/2021 Pezeshki ............. H04B 7/0647
(Continued)

FOREIGN PATENT DOCUMENTS

CN 108986450 A 12/2018
CN 109451430 A 3/2019
(Continued)

OTHER PUBLICATIONS

International Search Report issued in corresponding International Application No. PCT/CN2022/092496, mailed Jul. 19, 2022, 4 pages.

*Primary Examiner* — Kwasi Karikari
(74) *Attorney, Agent, or Firm* — IPX PLLC

(57) ABSTRACT

A method for information processing is provided. The method includes: receiving, by a terminal, first information sent by a first device entity; and performing, by the terminal, a positioning and related operation about surrounding environment sensing based on the first information. The first information includes at least one of the following: a first request used to indicate the terminal to perform the positioning and related operation about surrounding environment sensing based on a first processing method; first sub-information for indicating the first processing method; first assistance information used for the first processing method; result information obtained by processing based on a second processing method; an indication for requesting second sub-information, where the second sub-information is terminal related information or information obtained by hiding an information feature of the terminal related information; or an indication for requesting third sub-information that is used to update a third processing method.

18 Claims, 4 Drawing Sheets

(51) Int. Cl.

| | |
|---|---|
| ***H04W 12/06*** | (2021.01) |
| ***H04W 36/36*** | (2009.01) |
| ***H04W 64/00*** | (2009.01) |

(58) Field of Classification Search

CPC ... H04W 64/006; H04W 4/023; H04W 4/021; H04W 4/02; H04W 64/003; H04W 4/33; H04W 4/025; H04W 72/23; H04W 24/06; H04W 4/38; H04W 16/22; H04W 84/005; H04W 28/0226; H04W 40/18; H04W 40/20; H04W 16/20; H04W 16/28; H04W 36/0083; H04W 24/04; H04W 16/24; H04W 52/0261; H04W 72/542; H04W 12/33; H04W 36/32; H04W 36/30; H04W 88/02; H04W 48/20; H04W 36/08; H04W 36/322; H04W 92/10; H04W 72/535; H04W 72/56; H04W 74/002; H04W 72/50; H04W 12/03; H04W 12/06; H04W 12/104

See application file for complete search history.

(56) References Cited

U.S. PATENT DOCUMENTS

2022/0046386 A1* 2/2022 Sundararajan ........ H04W 4/029
2022/0369070 A1* 11/2022 Feki ........................ G06N 5/01

FOREIGN PATENT DOCUMENTS

CN 209248760 A 8/2019
WO 2009097906 A1 8/2009
WO 2021022489 A1 2/2021

* cited by examiner

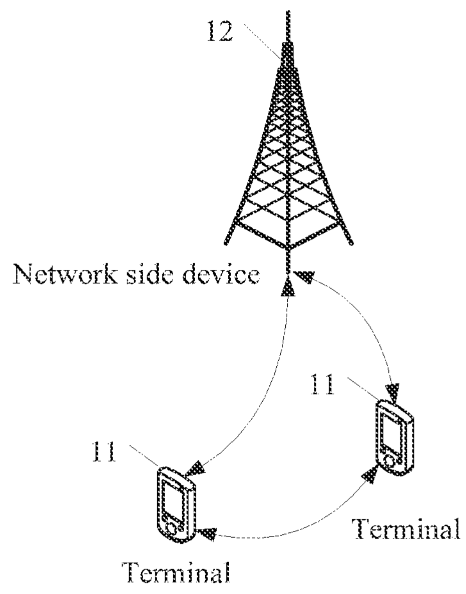
FIG. 1
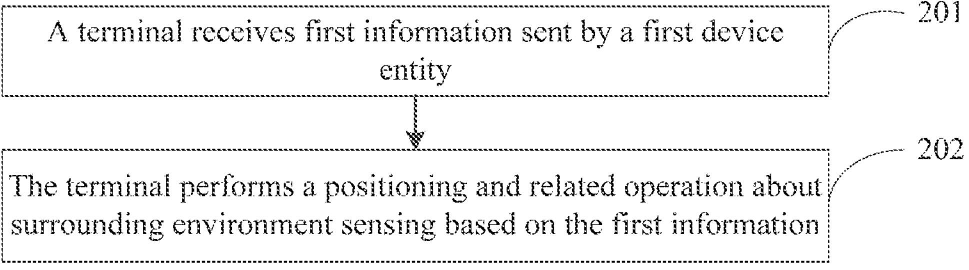
FIG. 2
The first device entity sends the first information to the terminal
301
FIG. 3
A second device entity sends first target information to the first device entity
401
FIG. 4

INFORMATION PROCESSING METHOD AND APPARATUS, TERMINAL, AND NETWORK SIDE DEVICE

CROSS-REFERENCE TO RELATED APPLICATIONS

This application is a continuation of International Application No. PCT/CN2022/092496, filed May 12, 2022, which claims priority to Chinese Patent Application No. 202110518394.X, filed May 12, 2021. The entire contents of each of the above-referenced applications are expressly incorporated herein by reference.

TECHNICAL FIELD

This application relates to the field of communications technologies, and in particular, relates to an information processing method and apparatus, a terminal, and a network side device.

BACKGROUND

In a communications system, a communications state of a terminal is usually determined by a network side device. For example, the network side device usually realizes a handover policy and/or decision based on only base station related information, which will lead to poor reliability of terminal communication.

SUMMARY

Embodiments of this application provide an information processing method and apparatus, a terminal, and a network side device.

According to a first aspect, an information processing method is provided, including:

receiving, by a terminal, first information sent by a first device entity; and performing, by the terminal, a positioning and related operation about surrounding environment sensing based on the first information, where the first information includes at least one of the following:

a first request, where the first request is used to indicate the terminal to perform the positioning and related operation about surrounding environment sensing based on a first processing method;

first sub-information for indicating the first processing method;

first assistance information used for the first processing method;

result information obtained by processing based on a second processing method;

an indication for requesting second sub-information, where the second sub-information is terminal related information or information obtained by hiding an information feature of the terminal related information; or an indication for requesting third sub-information, where the third sub-information is used to update a third processing method.

According to a second aspect, an information processing method is provided, including:

sending, by a first device entity, first information to a terminal, where the first information is used to trigger the terminal to perform a positioning and related operation about surrounding environment sensing, where the first information includes at least one of the following:

a first request, where the first request is used to indicate the terminal to perform the positioning and related operation about surrounding environment sensing based on a first processing method;

first sub-information for indicating the first processing method;

first assistance information used for the first processing method;

result information obtained by processing based on a second processing method;

an indication for requesting second sub-information, where the second sub-information is terminal related information or information obtained by hiding an information feature of the terminal related information; or an indication for requesting third sub-information, where the third sub-information is used to update a third processing method.

According to a third aspect, an information processing method is provided, including:

sending, by a second device entity, first target information to a first device entity, where the first target information includes second device entity related information or information obtained by performing second preset processing on the second device entity related information, and the first target information is used to determine first information sent by the first device entity to a terminal, where the first information is used to trigger the terminal to perform a positioning and related operation about surrounding environment sensing, and the first information includes at least one of the following:

a first request, where the first request is used to indicate the terminal to perform the positioning and related operation about surrounding environment sensing based on a first processing method;

first sub-information for indicating the first processing method;

first assistance information used for the first processing method; or result information obtained by processing based on a second processing method.

According to a fourth aspect, an information processing apparatus is provided, including:

a first receiving module, configured to receive first information sent by a first device entity and an execution module, configured to perform a positioning and related operation about surrounding environment sensing based on the first information, where the first information includes at least one of the following:

a first request, where the first request is used to indicate a terminal to perform the positioning and related operation about surrounding environment sensing based on a first processing method;

first sub-information for indicating the first processing method;

first assistance information used for the first processing method;

result information obtained by processing based on a second processing method;

an indication for requesting second sub-information, where the second sub-information is terminal related information or information obtained by hiding an information feature of the terminal related information; or an indication for requesting third sub-information, where the third sub-information is used to update a third processing method.

According to a fifth aspect, an information processing apparatus is provided, including:

a second sending module, configured to send first information to a terminal, where the first information is used to trigger the terminal to perform a positioning and related operation about surrounding environment sensing, where the first information includes at least one of the following:

a first request, where the first request is used to indicate the terminal to perform the positioning and related operation about surrounding environment sensing based on a first processing method:

first sub-information for indicating the first processing method;

first assistance information used for the first processing method;

result information obtained by processing based on a second processing method;

an indication for requesting second sub-information, where the second sub-information is terminal related information or information obtained by hiding an information feature of the terminal related information; or an indication for requesting third sub-information, where the third sub-information is used to update a third processing method.

According to a sixth aspect, an information processing apparatus is provided, including:

a third sending module, configured to send first target information to a first device entity, where the first target information includes second device entity related information or information obtained by performing second preset processing on the second device entity related information, and the first target information is used to determine first information sent by the first device entity to a terminal, where the first information is used to trigger the terminal to perform a positioning and related operation about surrounding environment sensing, and the first information includes at least one of the following:

a first request, where the first request is used to indicate the terminal to perform the positioning and related operation about surrounding environment sensing based on a first processing method;

first sub-information for indicating the first processing method;

first assistance information used for the first processing method; or result information obtained by processing based on a second processing method.

According to a seventh aspect, a terminal is provided, where the terminal includes a processor, a memory, and a program or an instruction stored in the memory and executable on the processor, and when the program or instruction is executed by the processor, steps of the method according to the first aspect are implemented.

According to an eighth aspect, a terminal is provided, including a processor and a communications interface, where the communications interface is configured to receive first information sent by a first device entity; and the processor is configured to perform a positioning and related operation about surrounding environment sensing based on the first information, where the first information includes at least one of the following:

a first request, where the first request is used to indicate a terminal to perform the positioning and related operation about surrounding environment sensing based on a first processing method;

first sub-information for indicating the first processing method;

first assistance information used for the first processing method;

result information obtained by processing based on a second processing method;

an indication for requesting second sub-information, where the second sub-information is terminal related information or information obtained by hiding an information feature of the terminal related information; or an indication for requesting third sub-information, where the third sub-information is used to update a third processing method.

According to a ninth aspect, a network side device is provided, where the network side device includes a processor, a memory, and a program or an instruction stored in the memory and executable on the processor, and when the program or the instruction is executed by the processor, steps of the method according to the second aspect or the third aspect are implemented.

According to a tenth aspect, a network side device is provided, including a processor and a communications interface, where the communications interface is configured to send first information to a terminal, and the first information is used to trigger the terminal to perform a positioning and related operation about surrounding environment sensing, where the first information includes at least one of the following:

a first request, where the first request is used to indicate the terminal to perform the positioning and related operation about surrounding environment sensing based on a first processing method;

first sub-information for indicating the first processing method;

first assistance information used for the first processing method;

result information obtained by processing based on a second processing method;

an indication for requesting second sub-information, where the second sub-information is terminal related information or information obtained by hiding an information feature of the terminal related information; or an indication for requesting third sub-information, where the third sub-information is used to update a third processing method; or the communications interface is configured to send first target information to a first device entity, where the first target information includes second device entity related information or information obtained by performing second preset processing on the second device entity related information, and the first target information is used to determine first information sent by the first device entity to a terminal, where the first information is used to trigger the terminal to perform a positioning and related operation about surrounding environment sensing, and the first information includes at least one of the following:

a first request, where the first request is used to indicate the terminal to perform the positioning and related operation about surrounding environment sensing based on a first processing method;

first sub-information for indicating the first processing method;

first assistance information used for the first processing method; or result information obtained by processing based on a second processing method.

According to an eleventh aspect, a readable storage medium is provided, where the readable storage medium stores a program or an instruction, and when the program or the instruction is executed by a processor, steps of the method according to the first aspect, the second aspect, or the third aspect are implemented.

According to a twelfth aspect, a chip is provided, where the chip includes a processor and a communications interface, the communications interface is coupled to the processor, and the processor is configured to run a program or an instruction, to implement steps of the method according to the first aspect, the second aspect, or the third aspect.

According to a thirteenth aspect, a computer program/program product is provided, where the computer program/program product is stored in a storage medium, and the computer program/program product is executed by at least one processor to implement steps of the method according to the first aspect, the second aspect, or the third aspect.

In this embodiment of this application, the terminal receives the first information sent by a first device entity; and the terminal performs a positioning and related operation about surrounding environment sensing based on the first information, where the first information includes at least one of the following: a first request, where the first request is used to indicate the terminal to perform the positioning and related operation about surrounding environment sensing based on a first processing method; first sub-information for indicating the first processing method; first assistance information used for the first processing method; result information obtained by processing based on a second processing method; an indication for requesting second sub-information, where the second sub-information is terminal related information or information obtained by hiding an information feature of the terminal related information; or an indication for requesting third sub-information, where the third sub-information is used to update a third processing method. Because the terminal performs the positioning and related operation about surrounding environment sensing based on the first information, the terminal related information may be used to assist in implementing handover policy and/or decision. As a result, this embodiment of this application improves the reliability of the terminal communication.

BRIEF DESCRIPTION OF DRAWINGS

FIG. 1 is a structural diagram of a wireless communications system to which embodiments of this application can be applied;

FIG. 2 is a first flowchart of an information processing method according to an embodiment of this application;

FIG. 3 is a second flowchart of an information processing method according to an embodiment of this application;

FIG. 4 is a third flowchart of an information processing method according to an embodiment of this application;

DETAILED DESCRIPTION

Figure 5:
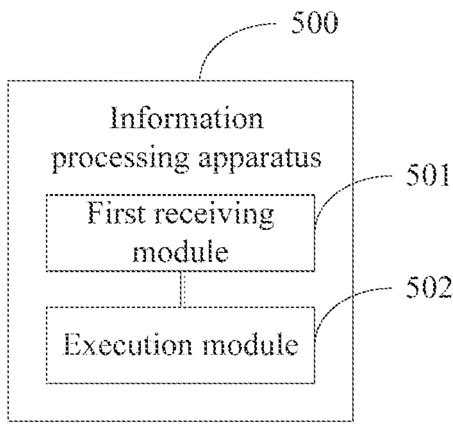
FIG. 5 is a first structural diagram of an information processing apparatus according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

It should be noted that the technology described in the embodiments of this application is not limited to a Long Term Evolution (LTE)/LTE-Advanced (LTE-A) system, and may also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. A New Radio (NR) system is described below for an illustration purpose, and the term NR is used in most of the descriptions, although these technologies can also be used in an application other than an NR system application, for example, a $6^{th}$ Generation (6G) communications system.

FIG. 1 is a block diagram of a wireless communications system to which embodiments of this application can be applied. The wireless communications system includes a terminal 11 and a network side device 12. The terminal 11 may also be referred to as a terminal device or User Equipment (UE). The terminal 11 may be a terminal side device such as a mobile phone, a tablet computer, a laptop computer or a notebook computer, a Personal Digital Assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a smartwatch, a bracelet, a headset, glasses, and the like. It should be noted that a specific type of the terminal 11 is not limited in the embodiments of this application. The network side device 12 may be a base station or a core network device. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, a Transmitting Receiving Point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

The following describes in detail the information processing method provided in the embodiments of this application through some embodiments and application scenarios thereof with reference to the accompanying drawings.

Referring to FIG. 2, FIG. 2 is a flowchart of an information processing method according to an embodiment of this application. As shown in FIG. 2, the method includes the following steps.

Step 201. A terminal receives first information sent by a first device entity.

Step 202. The terminal performs a positioning and related operation about surrounding environment sensing based on the first information.

The first information includes at least one of the following:

- a first request, where the first request is used to indicate the terminal to perform the positioning and related operation about surrounding environment sensing based on a first processing method;
- first sub-information for indicating the first processing method;
- first assistance information used for the first processing method;
- result information obtained by processing based on a second processing method;
- an indication for requesting second sub-information, where the second sub-information is terminal related information or information obtained by hiding an information feature of the terminal related information; or
- an indication for requesting third sub-information, where the third sub-information is used to update a third processing method.

It should be understood that the first information may include one or more of the first sub-information, the first assistance information, the result information, the indication for requesting second sub-information, and the indication for requesting third sub-information. When the first information includes a plurality of types of information, the plurality of types of information may be transmitted through one or more signaling.

In an embodiment of this application, the first processing method may include a processing method performed by using a first neural network, and the first sub-information includes neural network related information of the first neural network. In some embodiments, the first processing method may be used to infer the terminal related information, so as to realize positioning and surrounding environment sensing. Because the first processing method is used to perform the positioning and related operation about surrounding environment sensing at the terminal, the positioning and related operation about surrounding environment sensing can be performed by using terminal related information. The neural network related information may include at least one of a structure of the neural network or a parameter of the neural network. An execution result is reported based on the positioning and related operation about surrounding environment sensing, so that accuracy of implementing handover policy and/or decision can be improved, and reliability of terminal communication can be improved. It should be noted that in this embodiment of this application, the first information may directly carry content of the first assistance information, or may implicitly indicate the first assistance information through a network parameter of the first neural network. For example, in a case that the first sub-information of the first processing method includes neural network related information of the first neural network, and the first assistance information is obtained by performing first preset processing on the first target information, the first assistance information is implied in the network parameter of the first neural network.

In some embodiments, the first entity device and the second entity device can be understood as entity devices on the network side, or network side devices. The first entity device and the second entity device may be a same entity device or different entity devices. In some embodiments, the first device entity is one or more network elements that collect and distribute information, for example, the first device entity includes a set including one or at least two of the following: a base station, a Location Management Function (LMF), a Network Data. Analytics Function (NWDAF), a first network element, and a second network element, where the first network element is used to execute a network element of the second processing method, and the second network element is used for at least one of the following: collecting information required for performing the second processing method; or performing information calculation on information required for performing the second processing method. The second device entity is used to provide a network service for the terminal, and the second device entity is a base station, a core network device, or another network element other than the base station and the core network device.

It should be understood that the first processing method may be pre-specified in a protocol or indicated by the first device entity by using the first sub-information. When the first information includes the first assistance information used for the first processing method, the terminal related information and the second entity device related information can be inferred based on the first processing method indicated by the first sub-information or the first processing method specified in the protocol, so as to realize positioning and surrounding environment sensing.

The second processing method may be understood as a method used by the second device entity to infer the terminal related information or the terminal related information and the second entity device related information, and the second device entity may use the second processing method to infer the terminal related information or the terminal related information and the second entity device related information, so as to realize positioning and surrounding environment sensing. The terminal may interact with the first device entity in advance to report the terminal related information, or report the terminal related information through the second sub-information, and the first device entity obtains corresponding result information based on the terminal related information by using the second processing method, where the result information may be used to assist in realizing accuracy of handover policy and/or decision, and improve reliability of terminal communication.

The first processing method and the second processing method may be the same, or may be matched with each other. Matching with each other can be understood as that an input for the first processing method may include at least part of output for the second processing method, and a corresponding result can be obtained through the first processing method.

It should be understood that the third processing method may be the first processing method or the second processing method. In other embodiments, the third processing method may also be understood as other processing methods, such as a processing method for hiding an information feature. When the third processing method is the first processing method, the first device entity may perform corresponding processing based on third sub-information reported by each terminal, such as update information of the first processing method, and then the update information is sent to the terminal, so that the terminal can update the first processing method. When it is assumed that the third processing method is the second processing method, the first device entity may update the second processing method based on third information reported by each terminal.

In some embodiments, when the first information includes an indication for requesting the third sub-information, the terminal may determine the third sub-information based on the terminal related information. The terminal related information may be used as the third sub-information, or the third processing method may be trained by using the terminal related information, and obtained parameter information for updating the third processing method may be used as the third sub-information. In this way, the accuracy of the result information obtained by inferring with the third processing method can be improved.

In this embodiment of this application, the first information sent by a first device entity is received by using the terminal; and the terminal performs a positioning and related operation about surrounding environment sensing based on the first information, where the first information includes at least one of the following: a first request, where the first request is used to indicate the terminal to perform the positioning and related operation about surrounding environment sensing based on a first processing method; first sub-information for indicating the first processing method; first assistance information used for the first processing method; result information obtained by processing based on a second processing method; an indication for requesting second sub-information, where the second sub-information is terminal related information or information obtained by hiding an information feature of the terminal related information; or an indication for requesting third sub-information, where the third sub-information is used to update a third processing method. Because the terminal performs the positioning and related operation about surrounding environment sensing based on the first information, the terminal related information may be used to assist in implementing handover policy and/or decision. As a result, this embodiment of this application improves the reliability of the terminal communication.

In some embodiments, the performing, by the terminal, a positioning and related operation about surrounding environment sensing based on the first information includes at least one of the following:

performing, by the terminal, positioning and surrounding environment sensing based on the first processing method;

sending, by the terminal, the second sub-information or the third sub-information to a target device, where the target device is the first device entity or a second device entity; or performing, by the terminal, positioning and related processing about surrounding environment sensing based on at least pan of the result information.

In this embodiment of this application, when the first information includes at least one of the first request, the first sub-information for indicating a first processing method, and the first assistance information used for the first processing method, the first operation may include positioning and surrounding environment sensing based on the first processing method and/or sending the second sub-information or the third information to the target device. When the first information includes the result information obtained by processing based on the second processing method, the positioning and related operation about surrounding environment sensing may include performing positioning and related processing about surrounding environment sensing based on at least part of the result information. When the first information includes an indication for requesting the third sub-information, the positioning and related operation about surrounding environment sensing may include sending the third sub-information to the target device entity.

In some embodiments, an input for the second processing method includes the terminal related information.

In this embodiment of this application, the second processing method can be understood as a processing method by using a second neural network. In some embodiments, the input for the second neural network may further include other information besides the terminal related information, for example, the second device entity related information may be included.

In some embodiments, the terminal related information includes at least one of the following: positioning related information, service information, beam management (BM) related information, Channel State Information (CST) related information, mobility related information, or resource scheduling information.

The positioning related information can be understood as including related information obtained based on positioning technology, terminal information and/or various types of measurement information collected by the LMF. When the first device entity is another entity other than the LAW, the related information obtained based on the positioning technology may include information such as time, angle, signal strength, frequency offset, and the like obtained by using a corresponding positioning technology. When the first device entity is the LMF, the positioning related information may include position information obtained based on the positioning technology and/or various types of measurement results collected by the LMF.

The service information includes statistical information of service packet arrival.

The BM related information includes at least one of the following: a CSI-RS Resource Indicator (CRT), Reference Signal Received Power (RSRP), a Layer 1 Signal-to-Noise and Interference Ratio (LI-SINR), a Sounding Reference Signal (SRS) measurement result, statistical characteristics of the foregoing information, or the like.

The CSI related information includes at least one of the following: a Precoding Matrix Indicator (PMI), a Channel Quality Indicator (CQI), a Rank Indicator (RI), a CST-RS Resource Indicator (CRI), a Layer 1 (L1), a Sounding Reference Signal (SRS) measurement result, statistical characteristics of the foregoing information, or the like.

It should be noted that service information, BM related information, CSI related information, mobility related information, and resource scheduling information can be understood as local information of the terminal, and the local information used can be different for different purposes, and the corresponding first processing method and second processing method can be different.

The mobility related information may include at least one of the following: a Radio Resource Management (RRM) measurement result or statistical characteristics of the RRM measurement result.

The resource scheduling information may include at least one of the following: a time domain resource occupied in a specific period of time or statistical characteristics of the time domain resource.

In some embodiments, the second sub-information further includes measurement information of a target cell, and the measurement information includes at least one of beam measurement information, channel measurement information, and RRM measurement information; or the second sub-information includes information obtained by hiding an information feature of at least one measurement information of a target cell, and the target cell includes at least one of a serving cell or a neighboring cell.

In some embodiments, a manner for hiding the information feature includes any one of the following: encryption processing and performing feature abstraction processing by using a preset neural network.

In some embodiments, the terminal related information in which the information feature is hidden does not support recovery or cannot recover original information within a predefined time, or whether the terminal related information in which the information feature is hidden supports recovery is specified by a protocol, indicated by the first device entity, or indicated by the terminal.

In some embodiments, in a case that the first information includes an indication for requesting the second sub-information, the first information further includes at least one of the following:

- third sub-indication information that is used to indicate a manner for hiding the information feature; or
- fourth sub-indication information that is used to determine information content of the terminal related information.

In this embodiment of this application, a manner for hiding the information feature includes any one of the following: encryption processing and performing feature abstraction processing by using a preset neural network. The manner for hiding the information feature is indicated by the third sub-information, and which terminal related information needs to be used is indicated by the fourth sub-information. It should be understood that when the first information does not include the third sub-information, a default information feature hiding method can be used; and when the first information does not include the third sub-information, information feature hiding may be performed on the default terminal related information.

In some embodiments, the first assistance information meets any one of the following:

- the first assistance information is obtained by performing first preset processing on first target information;
- the first assistance information is the first target information; or
- in a case that the terminal and the first device entity are authenticated through a preset interactive authentication process, the first assistance information is the first target information, where
- the first target information includes second device entity related information or information obtained by performing second preset processing on the second device entity related information.

In this embodiment of this application, the first device entity and the second device entity may be a same device entity or different device entities, and when the first device entity is different from the second device entity, the first device entity may first obtain first target information. The following describes in detail the case that the first device entity is different from the second device entity.

For example, the first device entity is a core network device, and the second device entity is a base station. The first device entity may send request information to the second device entity to request second device entity related information. The second device entity may directly send the second device entity related information to the first device entity, or send the second device entity related information to the first device entity after performing second preset processing on the second device entity. To be specific, the first device entity may send the first target information learned from the second device entity to the terminal, and may further process the first target information learned from the second device entity and send it to the terminal.

The second preset processing includes at least one of the following: encryption processing and feature abstraction processing performed by using a preset neural network.

It should be understood that a processing manner of the second preset processing may be specified in the protocol or indicted by the first device entity. For example, the processing manner of the second preset processing may be indicated in the request information, or the processing manner of the second preset processing may be configured for the second device entity in advance before sending the request.

After receiving the first target information, the first device entity may send the first target information to the terminal as the first assistance information; the first target information may also be sent to the terminal as the first assistance information when the terminal and the first device entity are authenticated through a preset interaction process; and the first assistance information may also be obtained after the first preset processing is performed on the first target information, and then the first assistance information is sent to the terminal.

The processing manner of the first preset processing may be specified in the protocol, indicated by the terminal, or determined by the first device entity, and is not further limited herein. In some embodiments of this application, the first preset processing includes at least one of the following: encryption processing and performing feature abstraction processing by using a preset neural network.

In some embodiments, the second device entity related information includes at least one of second device entity measurement information, second device entity implementation information, or second device entity statistical information.

In this embodiment of this application, the second device entity implementation information includes at least one of antenna configuration information for second device entity, beam direction information of second device entity, or position coordinate information of second device entity;

- the second device entity measurement information includes measurement information obtained by the second device entity at an air interface; and the second device entity statistical information includes statistical information obtained by performing long-term measurement on the air interface by the second device entity.

The position information of the terminal is highly correlated with the CSI result, the beam measurement result, and the RIM measurement result, and can effectively assist CSI prediction, motion trajectory prediction, and the like.

In some embodiments, the second device entity related information includes at least one of the following: information of the terminal in a corresponding carrier or bandwidth part; statistical information of a terminal in a plurality of carriers or bandwidth parts; or statistical information of a plurality of terminals.

In some embodiments, the first sub-information includes update information for the first processing method.

In this embodiment of this application, the update information of the first processing method may be the updated first processing method or the updated parameter in the first processing method. Because the first device entity indicates the update information of the first processing method through the first sub-information, the terminal can update the first processing method in time, thereby improving inference accuracy of the first processing method. Therefore, this embodiment of this application can improve air interface performance, thereby further improving communication reliability of the terminal.

In some embodiments, in a case that the first information is result information obtained by processing based on the second processing method, before the receiving, by a terminal, first information sent by a first device entity, the method further includes:

sending, by the terminal, the second sub-information to the first device entity, where the second sub-information is used to determine the result information.

In this embodiment of this application, the first device entity can obtain the second device entity related information in advance, and then perform the positioning and related operation about surrounding environment sensing based on the second sub-information, or based on the second sub-information and the second device entity related information by using the second processing method, to obtain corresponding result information, and send the result information to the terminal through the first information, and the terminal may carry out further processing.

In order to better understand this application, it is assumed in the following that the first device entity is different from the second device entity, and the second device entity is a base station, which will be explained in detail through some specific examples.

Embodiment 1: The base station collects related information, but the terminal preprocesses the positioning related information.

Step 1. The first device entity configures a manner of preprocessing positioning related information to the terminal.

Step 2. The terminal preprocesses the positioning related information based on the manner configured by the first device entity or the manner specified in the protocol to obtain preprocessed information.

For example, one or more items of positioning related information are used as the input, and a predefined, configured, or specified neural network is preprocessed to obtain preprocessed information. The preprocessing can be understood as the processing performed in the first processing method or the information feature hiding processing in the foregoing embodiment.

In some embodiments, the positioning related information may include a plurality of items of information within a specified time period, including information obtained at different time points, or a plurality of different types of information.

In some embodiments, other related information can be used besides the positioning related information, including service information, BM, CSI, mobility and resource occupation, and other related information.

In some embodiments, the positioning related information may be processed in different manners for different purposes, for example, different neural networks are used to preprocess the positioning related information for CSI and mobility.

In some embodiments, the preprocessing manner is based on agreement, configuration, request, or report, and further, it can be selected to recover or cannot recover the position information at the base station.

Step 3. The terminal sends preprocessed information to the base station.

In some embodiments, the terminal may send different types of information to the base station for different purposes, such as sending information processed by different preprocessing manners for CSI and mobility.

In some embodiments, the terminal may send the preprocessed information based on a base station request (the base station request is determined based on a terminal capability), and the base station request carries corresponding destination information (for example, whether it is used for CSI, BM, or mobility), or carries corresponding preprocessing manner related information.

In some embodiments, the terminal indicates to the base station how to use the preprocessed information, or it is specified in the protocol how to use the preprocessed information, or other entities configure the base station how to use the preprocessed information. How to use the preprocessed information can be understood as determining the second processing method, and processing the preprocessed information accordingly based on the second processing method.

In some embodiments, the preprocessed information cannot be recovered at the base station, or whether to recover can be configured, can be specified in some manner, or needs to be agreed by the terminal.

Step 4. The base station may process the information reported by the terminal based on the protocol agreement, the configuration of other entities, or the processing manner indicated by the terminal, to obtain corresponding output results.

Embodiment 2: The first device entity collects related information.

Step 1. The base station sends positioning related information to the first device entity.

The positioning related information may include at least one of service information, BM related information, CSI related information, mobility related information, or resource scheduling information.

In some embodiments, the service information includes statistical information of service packet arrival.

In some embodiments, the BM related information includes at least one of the following: CRI, RSRP, L1-SINR, the SRS measurement result, statistical characteristics of the foregoing information, or the like.

In some embodiments, the CSI related information includes at least one of the following: PMI, CQI, RI, CRI, L1, the SRS measurement result, statistical characteristics of the foregoing information, or the like.

In some embodiments, the base station may also send user identification information to the first device entity. To be specific, the positioning related information further includes the user identification information, or the base station sends the positioning related information and the user identification information to the first device entity.

It should be understood that in this embodiment of this application, the base station may interact with the terminal in advance to obtain positioning related information, or positioning related information with which information feature hiding is performed, and then send the positioning related information to the first device entity. In other embodiments, the positioning related information can also be directly sent by the terminal to the first device entity.

In some embodiments, the base station may periodically send the positioning related information to the first device entity, or may send the positioning related information to the first device entity based on event trigger. It should be understood that the positioning related information may be corresponding measurement results at a plurality of different time points, or may be a single measurement result.

In some embodiments, the base station may specify a result of expected feedback anchor specify a time point, a time interval, or a latest time to obtain the expected feedback while sending information.

In some embodiments, the base station may further obtain other information of the user with other network elements, and send the information to the first device entity. The other information may include at least one of a user identity, other service information, user cell residence history information, or handover history information, where the user identity may include information such as an International Mobile Subscriber Identity (IMSI) and/or an Internet protocol (IP).

In some embodiments, the first device entity feeds back first indication information to the base station, where the first indication information is used to indicate a target object, a target strategy, or intermediate data for completing a relevant decision.

The target object includes at least one of a target handover cell, a target handover beam, and a target scheduling resource; and the target strategy includes a strategy associated with the target handover cell, a strategy associated with the target handover beam, and a strategy associated with the target scheduling resource.

The intermediate data can be understood as including first intermediate data for determining the target handover cell or second intermediate data for determining the strategy associated with the target handover cell; including third intermediate data for determining the target handover beam and fourth intermediate data for determining the strategy associated with the target handover beam; or including fifth intermediate data for determining the target scheduling resources and sixth intermediate data for determining the strategy associated with the target scheduling resource.

In some embodiments, that base station may determine the processing method of the positioning related information based on the first indication information fed back by the first device entity.

Step 2. The base station indicates the processing method to the first device entity, or processes the processing manner of the positioning related information based on the processing indication of the processing method specified in advance, that is, the processing manner of the second processing method.

Embodiment 3: The base station collects related information, but the first device entity preprocesses the positioning related information.

Step 1. The base station requests corresponding positioning related information from the first device entity.

In some embodiments, the request includes a use purpose of the positioning related information.

In some embodiments, the request includes a processing manner of the positioning related information.

Step 2. The first device entity preprocesses the positioning related information based on the manner requested by the base station or the manner specified in the protocol to obtain preprocessed information.

For example, the first device entity may use one or more items of positioning related information as the input, and a predefined, configured, or specified neural network in a protocol is preprocessed to obtain preprocessed information.

In some embodiments, the positioning related information may include a plurality of items of information within a specified time period, including information obtained at different time points, or a plurality of different types of information.

In some embodiments, other related information can be used besides the positioning related information, including service information, BM, CSI, mobility and resource occupation, and other related information.

In some embodiments, the positioning related information may be processed in different manners for different purposes, for example, different neural networks are used to preprocess the positioning related information for CSI and mobility.

In some embodiments, the preprocessing manner is based on agreement, configuration, request, or report, and further, it can be selected to recover or cannot recover the position information at the base station.

Step 3. The first device entity sends preprocessed information to the base station.

In some embodiments, the first device entity may also indicate, to the base station, how to use the preprocessed information.

Step 4. The base station may process the preprocessed information correspondingly based on the protocol agreement, the configuration of other entities, or the processing manner indicated by the terminal.

It should be noted that in some solutions, the first device entity may also send the positioning related information to the base station when the base station is authorized by the terminal, and the base station can comprehensively process all the information. For example, the second processing method is used for corresponding processing.

Embodiment 4: The base station collects related information, preprocesses the related information based on the configuration of the first device entity, and sends the related information to the first device entity, to improve positioning accuracy.

In some embodiments, information required for preprocessing includes at least one of beam measurement, channel measurement, or RRM measurement in a serving cell or a neighboring cell.

In some embodiments, the preprocessing manner is configured to the base station by the first device entity; and the preprocessing manner may include: one or more of averaging, filtering, and accumulation by weight; or processing based on the configured or specified neural network, and the like.

Referring to FIG. 3, FIG. 3 is a flowchart of another information processing method according to an embodiment of this application. As shown in FIG. 3, the method includes the following steps.

Step 301. A first device entity sends first information to a terminal, where the first information is used to trigger the terminal to perform a positioning and related operation about surrounding environment sensing.

The first information includes at least one of the following:

- a first request, where the first request is used to indicate the terminal to perform the positioning and related operation about surrounding environment sensing based on a first processing method;
- first sub-information for indicating the first processing method;
- first assistance information used for the first processing method;
- result information obtained by processing based on a second processing method;
- an indication for requesting second sub-information, where the second sub-information is terminal related information or information obtained by hiding an information feature of the terminal related information; or
- an indication for requesting third sub-information, where the third sub-information is used to update a third processing method.

In some embodiments, the positioning and related operation about surrounding environment sensing includes at least one of the following:

- performing positioning and surrounding environment sensing based on the first processing method;
- sending the second sub-information or the third sub-information to a target device, where the target device is the first device entity or a second device entity; or
- performing positioning and related processing about surrounding environment sensing based on at least part of the result information.

In some embodiments, an input for the second processing method includes the terminal related information.

In some embodiments, the terminal related information includes at least one of the following: positioning related information, service information, beam management (BM) related information, channel state information (CM) related information, mobility related information, or resource scheduling information.

In some embodiments, the second sub-information further includes measurement information of a target cell, and the measurement information includes at least one of beam measurement information, channel measurement information, and RRM measurement information; or the second sub-information includes information obtained by hiding an information feature of at least one measurement information of a target cell, and the target cell includes at least one of a serving cell and a neighboring cell.

In some embodiments, a manner for hiding the information feature includes any one of the following: encryption processing and performing feature abstraction processing by using a preset neural network.

In some embodiments, in a case that the first information includes an indication for requesting the second sub-information, the first information further includes at least one of the following:

- third sub-indication information that is used to indicate a manner for hiding the information feature; or
- fourth sub-indication information that is used to determine information content of the terminal related information.

In some embodiments, the first assistance information meets any one of the following:

- the first assistance information is obtained by performing first preset processing on first target information;
- the first assistance information is the first target information; or
- in a case that the terminal and the first device entity are authenticated through a preset interactive authentication process, the first assistance information is the first target information, where
- the first target information includes second device entity related information or information obtained by performing second preset processing on the second device entity related information.

In some embodiments, the second device entity is used to provide a network service for the terminal, and the second device entity is a base station, a core network device, or another network element other than the base station and the core network device.

In some embodiments, the second device entity related information includes at least one of second device entity measurement information, second device entity implementation information, or second device entity statistical information.

In some embodiments, the second device entity implementation information includes at least one of: antenna configuration information for second device entity, beam direction information of second device entity, or position coordinate information of second device entity;

- the second device entity measurement information includes measurement information obtained by the second device entity at an air interface; and
- the second device entity statistical information includes statistical information obtained by performing long-term measurement on the air interface by the second device entity.

In some embodiments, the second device entity related information includes at least one of the following: information of the terminal in a corresponding carrier or bandwidth part; statistical information of a terminal in a plurality of carriers or bandwidth parts; or statistical information of a plurality of terminals.

In some embodiments, the first preset processing includes at least one of the following: encryption processing or feature abstraction processing performed by using a preset neural network.

In some embodiments, the second preset processing includes at least one of the following encryption processing or feature abstraction processing performed by using a preset neural network.

In some embodiments, the terminal related information in which the information feature is hidden does not support recovery or cannot recover original information within a predefined time, or whether the terminal related information in which the information feature is hidden supports recovery is specified by a protocol, indicated by the first device entity, or indicated by the terminal.

In some embodiments, the first processing method includes a processing method performed by using a first neural network, and the first sub-information is used to indicate neural network related information of the first neural network.

In some embodiments, the neural network related information includes at least one of a structure of the neural network or a parameter of the neural network.

In some embodiments, the first device entity includes a set including one or at least two of the following: a base station, a location management function (LMF), a network data analytics function (NWDAF), a first network element, and a second network element, where the first network element is used to execute a network element of the second processing method, and the second network element is used for at least one of the following: collecting information required for performing the second processing method; or performing information calculation on information required for performing the second processing method.

In some embodiments, the first sub-information includes update information for the first processing method.

In some embodiments, in a case that the first information is result information obtained by processing based on the second processing method, before the sending, by a first device entity, first information to the terminal, the method further includes:

receiving, by the first device entity, the second sub-information sent by the terminal, where the second sub-information is used to determine the result information.

It should be noted that this embodiment is used as an implementation of a first device entity corresponding to the embodiment shown in FIG. 2. For a specific implementation of this embodiment, refer to related descriptions of the embodiment shown in FIG. 2. To avoid repetition, details are not described herein again.

Referring to FIG. 4, FIG. 4 is a flowchart of another information processing method according to an embodiment of this application. As shown in FIG. 4, the method includes the following steps.

Step 401. A second device entity sends first target information to a first device entity, where the first target information includes second device entity related information or information obtained by performing second preset processing on the second device entity related information, and the first target information is used to determine first information sent by the first device entity to a terminal.

The first information is used to trigger the terminal to perform a positioning and related operation about surrounding environment sensing, and the first information includes at least one of the following:

a first request, where the first request is used to indicate the terminal to perform the positioning and related operation about surrounding environment sensing based on a first processing method;

first sub-information for indicating the first processing method;

first assistance information used for the first processing method; or result information obtained by processing based on a second processing method.

In some embodiments, the positioning and related operation about surrounding environment sensing includes at least one of the following:

performing positioning and surrounding environment sensing based on the first processing method;

sending second sub-information or third sub-information to a target device, where the target device is the first device entity or a second device entity, or performing positioning and related processing about surrounding environment sensing based on at least part of the result information.

In some embodiments, an input for the second processing method includes the terminal related information, where the second sub-information is terminal related information or information obtained by hiding an information feature of the terminal related information; and the third sub-information is used to update a third processing method.

In some embodiments, the terminal related information includes at least one of the following: positioning related information, service information, beam management (BM) related information, channel state information (CSI) related information, mobility related information, or resource scheduling information.

In some embodiments, the second sub-information further includes measurement information of a target cell, and the measurement information includes at least one of beam measurement information, channel measurement information, or RRM measurement information; or the second sub-information includes information obtained by hiding an information feature of at least one measurement information of a target cell, and the target cell includes at least one of a serving cell or a neighboring cell.

In some embodiments, a manner for hiding the information feature includes any one of the following: encryption processing or performing feature abstraction processing by using a preset neural network.

In some embodiments, in a case that the first information includes an indication for requesting the second sub-information, the first information further includes at least one of the following:

third sub-indication information that is used to indicate a manner for hiding the information feature; or fourth sub-indication information that is used to determine information content of the terminal related information.

In some embodiments, the first assistance information meets any one of the following:

the first assistance information is obtained by performing first preset processing on first target information;

the first assistance information is the first target information; or in a case that the terminal and the first device entity are authenticated through a preset interactive authentication process, the first assistance information is the first target information, where the first target information includes second device entity related information or information obtained by performing second preset processing on the second device entity related information.

In some embodiments, the second device entity is used to provide a network service for the terminal, and the second device entity is a base station, a core network device, or another network element other than the base station and the core network device.

In some embodiments, the second device entity related information includes at least one of second device entity measurement information, second device entity implementation information, or second device entity statistical information.

In some embodiments, the second device entity implementation information includes at least one of antenna configuration information for second device entity, beam direction information of second device entity, or position coordinate information of second device entity:

the second device entity measurement information includes measurement information obtained by the second device entity at an air interface; and the second device entity statistical information includes statistical information obtained by performing long-term measurement on the air interface by the second device entity.

In some embodiments, the second device entity related information includes at least one of the following: information of the terminal in a corresponding carrier or bandwidth part; statistical information of a terminal in a plurality of carriers or bandwidth parts; or statistical information of a plurality of terminals.

In some embodiments, the first preset processing includes at least one of the following: encryption processing or feature abstraction processing performed by using a preset neural network:

In some embodiments, the second preset processing includes at least one of the following: encryption processing or feature abstraction processing performed by using a preset neural network.

In some embodiments, the terminal related information in which the information feature is hidden does not support recovery or cannot recover original information within a predefined time, or whether the terminal related information in which the information feature is hidden supports recovery is specified by a protocol, indicated by the first device entity, or indicated by the terminal.

In some embodiments, the first processing method includes a processing method performed by using a first neural network, and the first sub-information is used to indicate neural network related information of the first neural network.

In some embodiments, the neural network related information includes at least one of a structure of the neural network or a parameter of the neural network.

In some embodiments, the first device entity includes a set including one or at least two of the following: a base station, a location management function (LMF), a network data analytics function (NWDAF), a first network element, and a second network element, where the first network element is used to execute a network element of the second processing method, and the second network element is used for at least one of the following: collecting information required for performing the second processing method; or performing information calculation on information required for performing the second processing method.

In some embodiments, the first sub-information includes update information for the first processing method.

It should be noted that this embodiment is used as an implementation of a second device entity corresponding to the embodiment shown in FIG. 2. For a specific implementation of this embodiment, refer to related descriptions of the embodiment shown in FIG. 2. To avoid repetition, details are not described herein again.

It should be noted that, the information processing method provided in the embodiments of this application may be executed by an information processing apparatus, or a control module in the information processing apparatus for executing the information processing method. In the embodiments of this application, that the information processing apparatus performs the information processing method is used as an example to describe the information processing apparatus provided in the embodiments of this application.

Referring to FIG. 5, FIG. 5 is a structural diagram of an information processing apparatus according to an embodiment of this application. As shown in FIG. 5, the information processing apparatus 500 includes:

a first receiving module 501, configured to receive first information sent by a first device entity; and an execution module 502, configured to perform a positioning and related operation about surrounding environment sensing based on the first information, where the first information includes at least one of the following:

a first request, where the first request is used to indicate a terminal to perform the positioning and related operation about surrounding environment sensing based on a first processing method;

first sub-information for indicating the first processing method;

first assistance information used for the first processing method;

result information obtained by processing based on a second processing method;

an indication for requesting second sub-information, where the second sub-information is terminal related information or information obtained by hiding an information feature of the terminal related information; or an indication for requesting third sub-information, where the third sub-information is used to update a third processing method.

In some embodiments, the execution module 502 is configured to perform at least one of the following:

performing positioning and surrounding environment sensing based on the first processing method;

sending the second sub-information or the third sub-information to a target device, where the target device is the first device entity or a second device entity; and performing positioning and related processing about surrounding environment sensing based on at least part of the result information.

In some embodiments, an input for the second processing method includes the terminal related information.

In some embodiments, the terminal related information includes at least one of the following: positioning related information, service information, beam management (BM) related information, channel state information (CSI) related information, mobility related information, and resource scheduling information.

In some embodiments, the second sub-information further includes measurement information of a target cell, and the measurement information includes at least one of beam measurement information, channel measurement information, and RRM measurement information; or the second sub-information includes information obtained by hiding an information feature of at least one measurement information of a target cell, and the target cell includes at least one of a serving cell and a neighboring cell.

In some embodiments, a manner for hiding the information feature includes any one of the following: encryption processing and performing feature abstraction processing by using a preset neural network.

In some embodiments, in a case that the first information includes an indication for requesting the second sub-information, the first information further includes at least one of the following:

third sub-indication information that is used to indicate a manner for hiding the information feature; and fourth sub-indication information that is used to determine information content of the terminal related information.

In some embodiments, the first assistance information meets any one of the following:

the first assistance information is obtained by performing first preset processing on first target information;

the first assistance information is the first target information; and in a case that the terminal and the first device entity are authenticated through a preset interactive authentication process, the first assistance information is the first target information, where the first target information includes second device entity related information or information obtained by performing second preset processing on the second device entity related information.

In some embodiments, the second device entity is used to provide a network service for the terminal, and the second device entity is a base station, a core network device, or another network element other than the base station and the core network device.

In some embodiments, the second device entity related information includes at least one of second device entity measurement information, second device entity implementation information, and second device entity statistical information.

In some embodiments, the second device entity implementation information includes at least one of: antenna configuration information for second device entity, beam direction information of second device entity, and position coordinate information of second device entity;

the second device entity measurement information includes measurement information obtained by the second device entity at an air interface; and the second device entity statistical information includes statistical information obtained by performing long-term measurement on the air interface by the second device entity.

In some embodiments, the second device entity related information includes at least one of the following: information of the terminal in a corresponding carrier or bandwidth part; statistical information of a terminal in a plurality of carriers or bandwidth parts; and statistical information of a plurality of terminals.

In some embodiments, the first preset processing includes at least one of the following: encryption processing and feature abstraction processing performed by using a preset neural network.

In some embodiments, the second preset processing includes at least one of the following: encryption processing and feature abstraction processing performed by using a preset neural network.

In some embodiments, the terminal related information in which the information feature is hidden does not support recovery or cannot recover original information within a predefined time, or whether the terminal related information in which the information feature is hidden supports recovery is specified by a protocol, indicated by the first device entity, or indicated by the terminal.

In some embodiments, the first processing method includes a processing method performed by using a first neural network, and the first sub-information is used to indicate neural network related information of the first neural network.

In some embodiments, the neural network related information includes at least one of a structure of the neural network and a parameter of the neural network.

In some embodiments, the first device entity includes a set including one or at least two of the following: a base station, a location management function (LMF), a network data analytics function (NWDAF), a first network element, and a second network element, where the first network element is used to execute a network element of the second processing method, and the second network element is used for at least one of the following: collecting information required for performing the second processing method; and performing information calculation on information required for performing the second processing method.

In some embodiments, the first sub-information includes update information for the first processing method.

In some embodiments, in a case that the first information is result information obtained by processing based on the second processing method, the information processing apparatus further includes:

a first sending module, configured to send the second sub-information to the first device entity, where the second sub-information is used to determine the result information.

The information processing apparatus provided in this embodiment of this application can implement processes of the method embodiment in FIG. 2. To avoid repetition, details are not described herein again.

Figure 6:
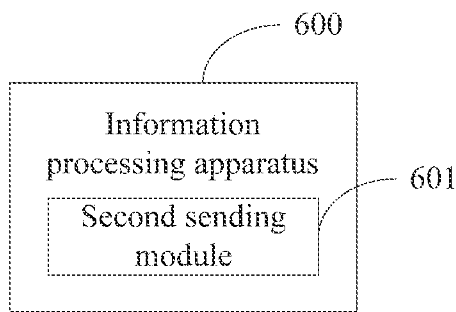
FIG. 6 is a second structural diagram of an information processing apparatus according to an embodiment of this application.

Referring to FIG. 6, FIG. 6 is a structural diagram of an information processing apparatus according to an embodiment of this application. As shown in FIG. 6, the information processing apparatus 600 includes:

a second sending module 601, configured to send first information to a terminal, where the first information is used to trigger the terminal to perform a positioning and related operation about surrounding environment sensing, where the first information includes at least one of the following:

a first request, where the first request is used to indicate the terminal to perform the positioning and related operation about surrounding environment sensing based on a first processing method;

first sub-information for indicating the first processing method;

first assistance information used for the first processing method;

result information obtained by processing based on a second processing method;

an indication for requesting second sub-information, where the second sub-information is terminal related information or information obtained by hiding an information feature of the terminal related information; and an indication for requesting third sub-information, where the third sub-information is used to update a third processing method.

In some embodiments, the positioning and related operation about surrounding environment sensing includes at least one of the following:

performing positioning and surrounding environment sensing based on the first processing method;

sending the second sub-information or the third sub-information to a target device, where the target device is the first device entity or a second device entity; and performing positioning and related processing about surrounding environment sensing based on at least part of the result information.

In some embodiments, an input for the second processing method includes the terminal related information.

In some embodiments, the terminal related information includes at least one of the following: positioning related information, service information, beam management (BM) related information, channel state information (CSI) related information, mobility related information, and resource scheduling information.

In some embodiments, the second sub-information further includes measurement information of a target cell, and the measurement information includes at least one of beam measurement information, channel measurement information, and RRM measurement information; or the second sub-information includes information obtained by hiding an information feature of at least one measurement information of a target cell, and the target cell includes at least one of a serving cell and a neighboring cell.

In some embodiments, a manner for hiding the information feature includes any one of the following: encryption processing and performing feature abstraction processing by using a preset neural network.

In some embodiments, in a case that the first information includes an indication for requesting the second sub-information, the first information further includes at least one of the following:

third sub-indication information that is used to indicate a manner for hiding the information feature; and fourth sub-indication information that is used to determine information content of the terminal related information.

In some embodiments, the first assistance information meets any one of the following:

the first assistance information is obtained by performing first preset processing on first target information;

the first assistance information is the first target information and in a case that the terminal and the first device entity are authenticated through a preset interactive authentication process, the first assistance information is the first target information, where the first target information includes second device entity related information or information obtained by performing second preset processing on the second device entity related information.

In some embodiments, the second device entity is used to provide a network service for the terminal, and the second device entity is a base station, a core network device, or another network element other than the base station and the core network device.

In some embodiments, the second device entity related information includes at least one of second device entity measurement information, second device entity implementation information, and second device entity statistical information.

In some embodiments, the second device entity implementation information includes at least one of antenna configuration information for second device entity, beam direction information of second device entity, and position coordinate information of second device entity;

the second device entity measurement information includes measurement information obtained by the second device entity at an air interface; and the second device entity statistical information includes statistical information obtained by performing long-term measurement on the air interface by the second device entity.

In some embodiments, the second device entity related information includes at least one of the following: information of the terminal in a corresponding carrier or bandwidth part; statistical information of a terminal in a plurality of carriers or bandwidth parts; and statistical information of a plurality of terminals.

In some embodiments, the first preset processing includes at least one of the following: encryption processing and feature abstraction processing performed by using a preset neural network.

In some embodiments, the second preset processing includes at least one of the following: encryption processing and feature abstraction processing performed by using a preset neural network.

In some embodiments, the terminal related information in which the information feature is hidden does not support recovery or cannot recover original information within a predefined time, or whether the terminal related information in which the information feature is hidden supports recovery is specified by a protocol, indicated by the first device entity, or indicated by the terminal.

In some embodiments, the first processing method includes a processing method performed by using a first neural network, and the first sub-information is used to indicate neural network related information of the first neural network.

In some embodiments, the neural network related information includes at least one of a structure of the neural network and a parameter of the neural network.

In some embodiments, the first device entity includes a set including one or at least two of the following: a base station, a location management function (LMF), a network data analytics function (NWDAF), a first network element, and a second network element, where the first network element is used to execute a network element of the second processing method, and the second network element is used for at least one of the following: collecting information required for performing the second processing method; and performing information calculation on information required for performing the second processing method.

In some embodiments, the first sub-information includes update information for the first processing method.

Figure 7:
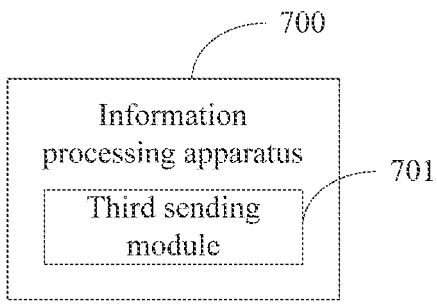
FIG. 7 is a third structural diagram of an information processing apparatus according to an of embodiment of this application.

Referring to FIG. 7, FIG. 7 is a structural diagram of an information processing apparatus according to an embodiment of this application. As shown in FIG. 7, the information processing apparatus 700 includes:

a third sending module 701, configured to send first target information to a first device entity, where the first target information includes second device entity related information or information obtained by performing second preset processing on the second device entity related information, and the first target information is used to determine first information sent by the first device entity to a terminal, where the first information is used to trigger the terminal to perform a positioning and related operation about surrounding environment sensing, and the first information includes at least one of the following:

a first request, where the first request is used to indicate the terminal to perform the positioning and related operation about surrounding environment sensing based on a first processing method;

first sub-information for indicating the first processing method;

first assistance information used for the first processing method; and result information obtained by processing based on a second processing method.

In some embodiments, the positioning and related operation about surrounding environment sensing includes at least one of the following:

performing positioning and surrounding environment sensing based on the first processing method;

sending second sub-information or third sub-information to a target device, where the target device is the first device entity or a second device entity; and performing positioning and related processing about surrounding environment sensing based on at least part of the result information, where the second sub-information is terminal related information or information obtained by hiding an information feature of the terminal related information; and the third sub-information is used to update a third processing method.

In some embodiments, an input for the second processing method includes the terminal related information.

In some embodiments, the terminal related information includes at least one of the following: positioning related information, service information, beam management (BM) related information, channel state information (CM) related information, mobility related information, and resource scheduling information.

In some embodiments, the second sub-information further includes measurement information of a target cell, and the measurement information includes at least one of beam measurement information, channel measurement information, and RRM measurement information; or the second sub-information includes information obtained by hiding an information feature of at least one measurement information of a target cell, and the target cell includes at least one of a serving cell and a neighboring cell.

In some embodiments, a manner for hiding the information feature includes any one of the following: encryption processing and performing feature abstraction processing by using a preset neural network.

In some embodiments, in a case that the first information includes an indication for requesting the second sub-information, the first information further includes at least one of the following:

third sub-indication information that is used to indicate a manner for hiding the information feature; and fourth sub-indication information that is used to determine information content of the terminal related information.

In some embodiments, the first assistance information meets any one of the following:

the first assistance information is obtained by performing first preset processing on first target information;

the first assistance information is the first target information; and in a case that the terminal and the first device entity are authenticated through a preset interactive authentication process, the first assistance information is the first target information, where the first target information includes second device entity related information or information obtained by performing second preset processing on the second device entity related information.

In some embodiments, the second device entity is used to provide a network service for the terminal, and the second device entity is a base station, a core network device, or another network element other than the base station and the core network device.

In some embodiments, the second device entity related information includes at least one of second device entity measurement information, second device entity implementation information, and second device entity statistical information.

In some embodiments, the second device entity implementation information includes at least one of antenna configuration information for second device entity, beam direction information of second device entity, and position coordinate information of second device entity;

the second device entity measurement information includes measurement information obtained by the second device entity at an air interface; and the second device entity statistical information includes statistical information obtained by performing long-term measurement on the air interface by the second device entity.

In some embodiments, the second device entity related information includes at least one of the following: information of the terminal in a corresponding carrier or bandwidth part; statistical information of a terminal in a plurality of carriers or bandwidth parts; and statistical information of a plurality of terminals.

In some embodiments, the first preset processing includes at least one of the following: encryption processing and feature abstraction processing performed by using a preset neural network.

In some embodiments, the second preset processing includes at least one of the following: encryption processing and feature abstraction processing performed by using a preset neural network.

In some embodiments, the terminal related information in which the information feature is hidden does not support recovery or cannot recover original information within a predefined time, or whether the terminal related information in which the information feature is hidden supports recovery is specified by a protocol, indicated by the first device entity, or indicated by the terminal.

In some embodiments, the first processing method includes a processing method performed by using a first neural network, and the first sub-information is used to indicate neural network related information of the first neural network.

In some embodiments, the neural network related information includes at least one of a structure of the neural network and a parameter of the neural network.

In some embodiments, the first device entity includes a set including one or at least two of the following: a base station, a location management function (LMF), a network data analytics function (NWDAF), a first network element, and a second network element, where the first network element is used to execute a network element of the second processing method, and the second network element is used for at least one of the following: collecting information required for performing the second processing method; and performing information calculation on information required for performing the second processing method.

In some embodiments, the first sub-information includes update information for the first processing method.

The information processing apparatus in this embodiment of this application may be an apparatus or an apparatus or electronic device with an operating system, or may be a component, an integrated circuit, or a chip in a terminal. The apparatus may be a mobile terminal, or a non-mobile terminal. For example, the mobile terminal may include but is not limited to the types of the terminal 11 listed above, and the non-mobile terminal may be a server, a Network Attached Storage (NAS), a Personal Computer (PC), a Television (TV), a teller machine, or a self-service machine. This is not specifically limited in the embodiments of this application.

The information processing apparatus provided in this embodiment of this application can implement the processes implemented in the method embodiment from FIG. 2 to FIG. 4, and a same technical effect can be achieved. To avoid repetition, details are not described herein again.

Figure 8:
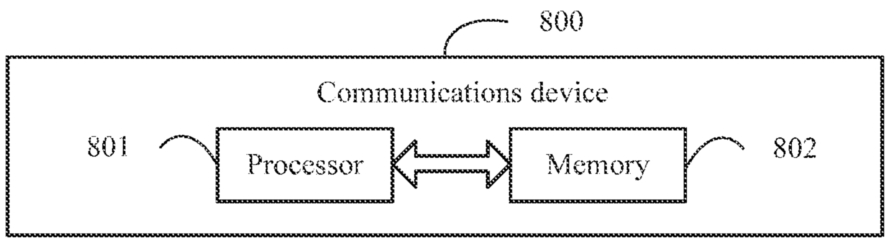
FIG. 8 is a structural diagram of a communications device according to an embodiment of this application.

As shown in FIG. 8, an embodiment of this application further provides a communications device 800, including a processor 801, a memory 802, and a program or an instruction stored in the memory 802 and executable on the processor 801, and when the program or the instruction is executed by the processor 801, the processes of the information processing method embodiment are implemented, and a same technical effect can be achieved. To avoid repetition, details are not described herein again.

Figure 9:
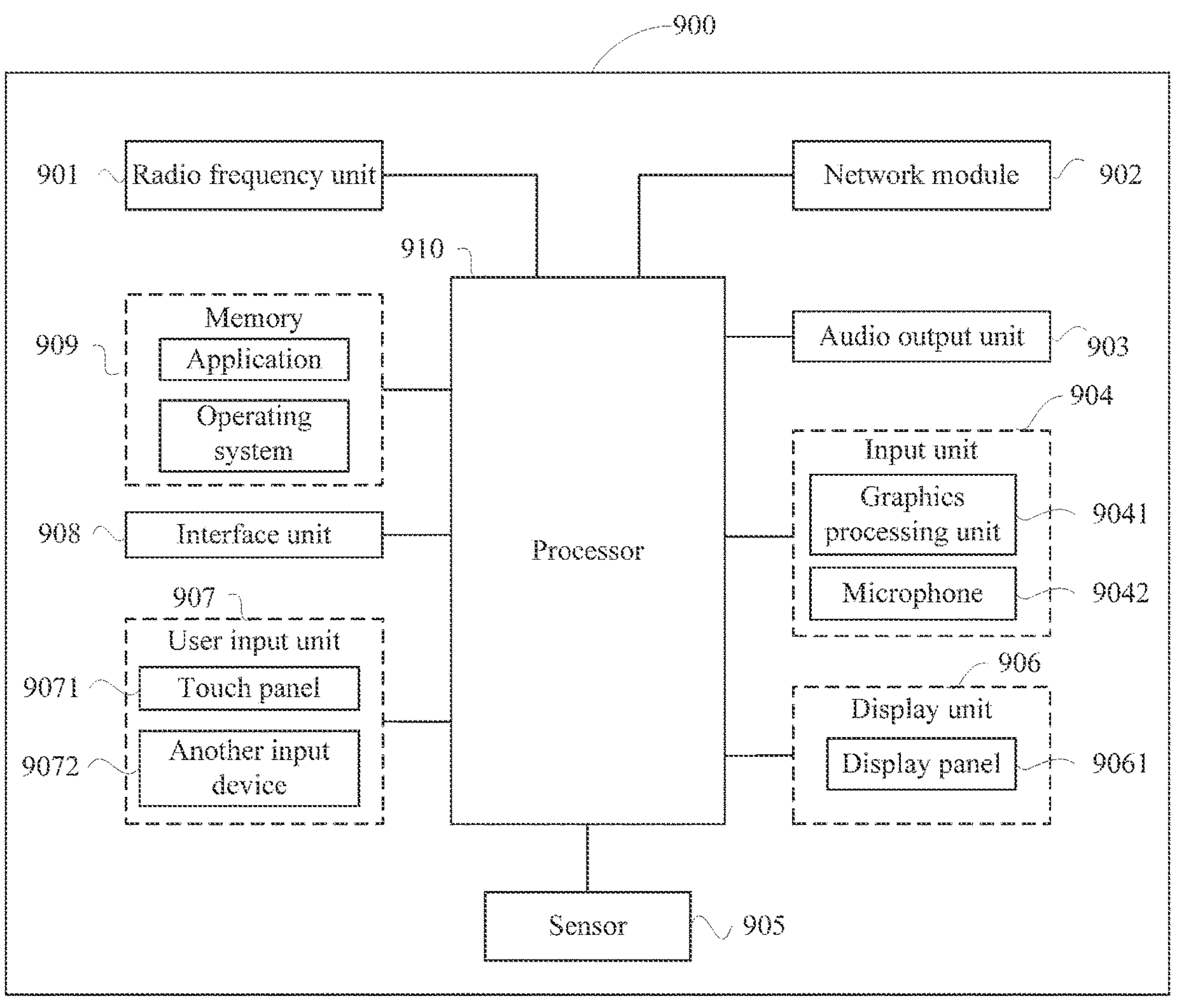
FIG. 9 is a structural diagram of a terminal according to an embodiment of this application.

An embodiment of this application further provides a terminal, including a processor and a communications interface, where the communications interface is configured to receive first information sent by a first device entity; and the processor is configured to perform a positioning and related operation about surrounding environment sensing based on the first information, where the first information includes at least one of the following:

a first request, where the first request is used to indicate a terminal to perform the positioning and related operation about surrounding environment sensing based on a first processing method;

first sub-information for indicating the first processing method;

first assistance information used for the first processing method;

result information obtained by processing based on a second processing method;

an indication for requesting second sub-information, where the second sub-information is terminal related information or information obtained by hiding an information feature of the terminal related information; and an indication for requesting third sub-information, where the third sub-information is used to update a third processing method. This terminal embodiment corresponds to the foregoing method embodiment on the terminal side. Each implementation process and implementation of the foregoing method embodiment may be applicable to this terminal embodiment, and a same technical effect can be achieved. FIG. 9 is a schematic diagram of a hardware structure of a terminal according to an embodiment of this application.

A terminal 900 includes but is not limited to at least a part of components such as a radio frequency unit 901, a network module 902, an audio output unit 903, an input unit 904, a sensor 905, a display unit 906, a user input unit 907, an interface unit 908, a memory 909, and a processor 910.

A person skilled in the art can understand that the terminal 900 may further include a power supply (such as a battery) that supplies power to each component. The power supply may be logically connected to the processor 910 by using a power supply management system, to implement functions such as charging and discharging management, and power consumption management by using the power supply management system. The terminal structure shown in FIG. 9 constitutes no limitation on the terminal, and the terminal may include more or fewer components than those shown in the figure, or combine some components, or have different component arrangements. Details are not described herein.

It should be understood that, in the embodiments of this application, the input unit 904 may include a Graphics Processing Unit (GPU) 9041 and a microphone 9042, and the graphics processing unit 9041 processes image data of a still picture or video obtained by an image capture apparatus (such as a camera) in a video capture mode or an image capture mode. The display unit 906 may include a display panel 9061. In some embodiments, the display panel 9061 may be configured in a form such as a liquid crystal display or an organic light-emitting diode. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but is not limited to a physical keyboard, a functional button (such as a volume control button or a power on/off button), a trackball, a mouse, and a joystick. Details are not described herein.

In this embodiment of this application, the radio frequency unit 901 receives downlink data from a network side device and then sends the downlink data to the processor 910 for processing; and sends uplink data to the network side device. Usually, the radio frequency unit 901 includes but is not limited to an antenna, at least one amplifier, a transceiver, a coupler, a low noise amplifier, a duplexer, and the like.

The memory 909 may be configured to store a software program or an instruction and various data. The memory 909 may mainly include a program or instruction storage area and a data storage area. The program or instruction storage area may store an operating system, and an application or an instruction required by at least one function (for example, a sound playing function or an image playing function). In addition, the memory 909 may include a high-speed random access memory, and may further include a non-transitory memory. The non-transitory memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-transient solid-state storage component.

The processor 910 may include one or more processing units. In some embodiments, an application processor and a modem processor may be integrated into the processor 910. The application processor mainly processes an operating system, a user interface, an application, an instruction, or the like. The modem processor mainly processes wireless communication, for example, a baseband processor. It can be understood that, the modem processor may not be integrated into the processor 910.

The radio frequency unit 901 is configured to receive first information sent by a first device entity; and the processor 910 is configured to perform a positioning and related operation about surrounding environment sensing based on the first information, where the first information includes at least one of the following:

a first request, where the first request is used to indicate a terminal to perform the positioning and related operation about surrounding environment sensing based on a first processing method;

first sub-information for indicating the first processing method;

first assistance information used for the first processing method;

result information obtained by processing based on a second processing method;

an indication for requesting second sub-information, where the second sub-information is terminal related information or information obtained by hiding an information feature of the terminal related information; and an indication for requesting third sub-information, where the third sub-information is used to update a third processing method.

In some embodiments, the processor 910 is configured to perform at least one of the following:

performing positioning and surrounding environment sensing based on the first processing method;

sending the second sub-information or the third sub-information to a target device, where the target device is the first device entity or a second device entity; and performing positioning and related processing about surrounding environment sensing based on at least part of the result information.

In some embodiments, an input for the second processing method includes the terminal related information.

In some embodiments, the terminal related information includes at least one of the following: positioning related information, service information, beam management (BM) related information, channel state information (CSI) related information, mobility related information, and resource scheduling information.

In some embodiments, the second sub-information further includes measurement information of a target cell, and the measurement information includes at least one of beam measurement information, channel measurement information, and RRM measurement information; or the second sub-information includes information obtained by hiding an information feature of at least one measurement information of a target cell, and the target cell includes at least one of a serving cell and a neighboring cell.

In some embodiments, a manner for hiding the information feature includes any one of the following: encryption processing and performing feature abstraction processing by using a preset neural network.

In some embodiments, in a case that the first information includes an indication for requesting the second sub-information, the first information further includes at least one of the following:

third sub-indication information that is used to indicate a manner for hiding the information feature; and fourth sub-indication information that is used to determine information content of the terminal related information.

In some embodiments, the first assistance information meets any one of the following:

the first assistance information is obtained by performing first preset processing on first target information;

the first assistance information is the first target information; and in a case that the terminal and the first device entity are authenticated through a preset interactive authentication process, the first assistance information is the first target information, where the first target information includes second device entity related information or information obtained by performing second preset processing on the second device entity related information.

In some embodiments, the second device entity is used to provide a network service for the terminal, and the second device entity is a base station, a core network device, or another network element other than the base station and the core network device.

In some embodiments, the second device entity related information includes at least one of second device entity measurement information, second device entity implementation information, and second device entity statistical information.

In some embodiments, the second device entity implementation information includes at least one of: antenna configuration information for second device entity, beam direction information of second device entity, and position coordinate information of second device entity;

the second device entity measurement information includes measurement information obtained by the second device entity at an air interface; and the second device entity statistical information includes statistical information obtained by performing long-term measurement on the air interface by the second device entity.

In some embodiments, the second device entity related information includes at least one of the following: information of the terminal in a corresponding carrier or bandwidth part; statistical information of a terminal in a plurality of carriers or bandwidth parts; and statistical information of a plurality of terminals.

In some embodiments, the first preset processing includes at least one of the following: encryption processing and feature abstraction processing performed by using a preset neural network.

In some embodiments, the second preset processing includes at least one of the following: encryption processing and feature abstraction processing performed by using a preset neural network.

In some embodiments, the terminal related information in which the information feature is hidden does not support recovery or cannot recover original information within a predefined time, or whether the terminal related information in which the information feature is hidden supports recovery is specified by a protocol, indicated by the first device entity, or indicated by the terminal.

In some embodiments, the first processing method includes a processing method performed by using a first neural network, and the first sub-information is used to indicate neural network related information of the first neural network.

In some embodiments, the neural network related information includes at least one of a structure of the neural network and a parameter of the neural network.

In some embodiments, the first device entity includes a set including one or at least two of the following: a base station, a location management function (LMF), a network data analytics function (NWDAF), a first network element, and a second network element, where the first network element is used to execute a network element of the second processing method, and the second network element is used for at least one of the following: collecting information required for performing the second processing method; and performing information calculation on information required for performing the second processing method.

In some embodiments, the first sub-information includes update information for the first processing method.

In some embodiments, the radio frequency unit 901 is further configured to: in a case that the first information is result information obtained by processing based on the second processing method, send the second sub-information to the first device entity, where the second sub-information is used to determine the result information.

An embodiment of this application further provides a network side device, including a processor and a communications interface, where the communications interface is configured to send first information to a terminal, and the first information is used to trigger the terminal to perform a positioning and related operation about surrounding environment sensing, where the first information includes at least one of the following:

a first request, where the first request is used to indicate the terminal to perform the positioning and related operation about surrounding environment sensing based on a first processing method;

first sub-information for indicating the first processing method;

first assistance information used for the first processing method;

result information obtained by processing based on a second processing method;

an indication for requesting second sub-information, where the second sub-information is terminal related information or information obtained by hiding an information feature of the terminal related information; and an indication for requesting third sub-information, where the third sub-information is used to update a third processing method; or the communications interface is configured to send first target information to a first device entity, where the first target information includes second device entity related information or information obtained by performing second preset processing on the second device entity related information, and the first target information is used to determine first information sent by the first device entity to a terminal, where the first information is used to trigger the terminal to perform a positioning and related operation about surrounding environment sensing, and the first information includes at least one of the following:

a first request, where the first request is used to indicate the terminal to perform the positioning and related operation about surrounding environment sensing based on a first processing method:

first sub-information for indicating the first processing method;

first assistance information used for the first processing method; and result information obtained by processing based on a second processing method.

This network side device embodiment corresponds to the foregoing method embodiment on the network side device. Each implementation process and implementation of the foregoing method embodiment may be applicable to this network side device embodiment, and a same technical effect can be achieved.

Figure 10:
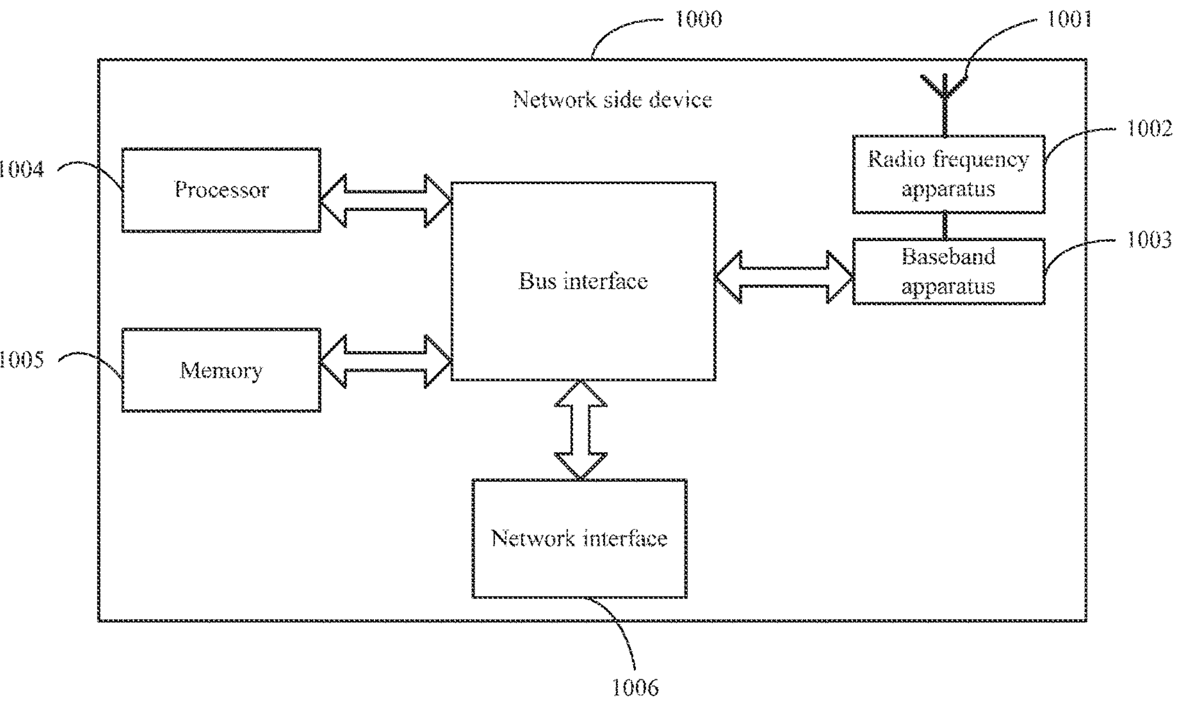
FIG. 10 is a structural diagram of a network side device according to an embodiment of this application.

An embodiment of this application further provides a network side device. As shown in FIG. 10, a network side device 1000 includes an antenna 1001, a radio frequency apparatus 1002, and a baseband apparatus 1003. The antenna 1001 is connected to the radio frequency apparatus 1002. In an uplink direction, the radio frequency apparatus 1002 receives information by using the antenna 1001, and sends the received information to the baseband apparatus 1003 for processing, in a downlink direction, the baseband apparatus 1003 processes to-be-sent information, and sends the information to the radio frequency apparatus 1002. The radio frequency apparatus 1002 processes the received information and then sends the information by using the antenna 1001.

The frequency band processing apparatus may be located in the baseband apparatus 1003. The method performed by the network side device in the foregoing embodiment may be implemented in the baseband apparatus 1003. The baseband apparatus 1003 includes a processor 1004 and a memory 1005.

The baseband apparatus 1003 may include, for example, at least one baseband board, where a plurality of chips are disposed on the baseband hoard. As shown in FIG. 10, one chip is, for example, the processor 1004, which is connected to the memory 1005, so as to invoke a program in the memory 1005 to perform operations of the network side device shown in the foregoing method embodiment.

The baseband apparatus 1003 may further include a network interface 1006, configured to exchange information with the radio frequency apparatus 1002. For example, the interface is a Common Public Radio Interface (CPRI).

The network side device in this embodiment of this application further includes an instruction or a program that is stored in the memory 1005 and that can be run on the processor 1004. The processor 1004 invokes the instruction or the program in the memory 1005 to perform the method performed by the modules shown in FIG. 6 or FIG. 7, and a same technical effect is achieved. To avoid repetition, details are not described herein again.

An embodiment of this application further provides a readable storage medium. The readable storage medium may be non-volatile or volatile. The readable storage medium stores a program or an instruction, and the program or the instruction is executed by a processor to implement the processes of the foregoing information processing method embodiment, and a same technical effect can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application farther provides a chip. The chip includes a processor and a communications interface, the communications interface is coupled to the processor, and the processor is configured to run a program or an instruction to implement processes of the embodiment of the information processing method, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a program product. The program product is stored in a non-transitory storage medium, and the program product is executed by at least one processor to implement the processes of the foregoing information processing method embodiment, and a same technical effect can be achieved. To avoid repetition, details are not described herein again.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined, in addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air conditioner, a base station, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A method for information processing, comprising:

receiving, by a terminal, first information sent by a first device entity; and performing, by the terminal, a positioning and related operation about surrounding environment sensing based on the first information, wherein the first information comprises at least one of the following:

a first request, wherein the first request is used to indicate the terminal to perform the positioning and related operation about surrounding environment sensing based on a first processing method;

first sub-information for indicating the first processing method;

first assistance information used for the first processing method;

result information obtained by processing based on a second processing method;

an indication for requesting second sub-information, wherein the second sub-information is terminal related information or information obtained by hiding an information feature of the terminal related information, the terminal related information comprises at least one of the following: positioning related information, service information, beam management (BM) related information, channel state information (CSI) related information, mobility related information, or resource scheduling information, a manner for hiding the information feature comprises any one of the following: encryption processing or performing feature abstraction processing by using a preset neural network; or an indication for requesting third sub-information, wherein the third sub-information is used to update a third processing method, wherein the first assistance information meets one of the following:

the first assistance information is obtained by performing first preset processing on first target information;

the first assistance information is the first target information; or when the terminal and the first device entity are authenticated through a preset interactive authentication process, the first assistance information is the first target information, wherein:

the first target information comprises second device entity related information or information obtained by performing second preset processing on the second device entity related information;

the second device entity related information comprises at least one of second device entity measurement information, second device entity implementation information, second device entity statistical information, information of the terminal in a corresponding carrier or bandwidth part, statistical information of a terminal in a plurality of carriers or bandwidth parts, or statistical information of a plurality of terminals; and the first preset processing or the second preset processing comprises at least one of the following: encryption processing or feature abstraction processing performed by using the preset neural network.

2. The method according to claim 1, wherein the performing, by the terminal, the positioning and related operation about surrounding environment sensing based on the first information comprises at least one of the following:

performing, by the terminal, positioning and surrounding environment sensing based on the first processing method;

sending, by the terminal, the second sub-information or the third sub-information to a target device, wherein the target device is the first device entity or a second device entity; or performing, by the terminal, positioning and related processing about surrounding environment sensing based on at least part of the result information.

3. The method according to claim 1, wherein the second sub-information further comprises measurement information of a target cell, and the measurement information comprises at least one of beam measurement information, channel measurement information, or RRM measurement information; or the second sub-information comprises information obtained by hiding an information feature of at least one measurement information of a target cell, and the target cell comprises at least one of a serving cell and a neighboring cell.

4. The method according to claim 1, wherein when the first information comprises an indication for requesting the second sub-information, the first information further comprises at least one of the following:

third sub-indication information that is used to indicate a manner for hiding the information feature; or fourth sub-indication information that is used to determine information content of the terminal related information.

5. The method according to claim 1, wherein the second device entity implementation information comprises at least one of: antenna configuration information for second device entity, beam direction information of second device entity, or position coordinate information of second device entity;

the second device entity measurement information comprises measurement information obtained by the second device entity at an air interface; and the second device entity statistical information comprises statistical information obtained by performing long-term measurement on the air interface by the second device entity.

6. The method according to claim 1, wherein the terminal related information in which the information feature is hidden does not support recovery or cannot recover original information within a predefined time, or whether the terminal related information in which the information feature is hidden supports recovery is specified by a protocol, indicated by the first device entity, or indicated by the terminal.

7. The method according to claim 1, wherein the first processing method comprises a processing method performed by using a first neural network, the first sub-information is used to indicate neural network related information of the first neural network, and the neural network related information comprises at least one of a structure of the neural network or a parameter of the neural network.

8. The method according to claim 1, wherein the first device entity comprises a set comprising one or at least two of the following: a base station, a location management function (LMF), a network data analytics function (NWDAF), a first network element, or a second network element, wherein the first network element is used to execute a network element of the second processing method, and the second network element is used for at least one of the following: collecting information required for performing the second processing method; or performing information calculation on information required for performing the second processing method.

9. The method according to claim 1, wherein when the first information is result information obtained by processing based on the second processing method, before the receiving, by the terminal, the first information sent by the first device entity, the method further comprises:

sending, by the terminal, the second sub-information to the first device entity, wherein the second sub-information is used to determine the result information.

10. A method for information processing, comprising:

sending, by a first device entity, first information to a terminal, wherein the first information is used to trigger the terminal to perform a positioning and related operation about surrounding environment sensing, wherein the first information comprises at least one of the following:

a first request, wherein the first request is used to indicate the terminal to perform the positioning and related operation about surrounding environment sensing based on a first processing method;

first sub-information for indicating the first processing method;

first assistance information used for the first processing method;

result information obtained by processing based on a second processing method;

an indication for requesting second sub-information, wherein the second sub-information is terminal related information or information obtained by hiding an information feature of the terminal related information, wherein the terminal related information comprises at least one of the following: positioning related information, service information, beam management (BM) related information, channel state information (CSI) related information, mobility related information, or resource scheduling information, and a manner for hiding the information feature comprises any one of the following: encryption processing or performing feature abstraction processing by using a preset neural network; or an indication for requesting third sub-information, wherein the third sub-information is used to update a third processing method, wherein the first assistance information meets one of the following:

the first assistance information is obtained by performing first preset processing on first target information;

the first assistance information is the first target information; or when the terminal and the first device entity are authenticated through a preset interactive authentication process, the first assistance information is the first target information, wherein the first target information comprises second device entity related information or information obtained by performing second preset processing on the second device entity related information, wherein the second device entity related information comprises at least one of second device entity measurement information, second device entity implementation information, second device entity statistical information, information of the terminal in a corresponding carrier or bandwidth part, statistical information of a terminal in a plurality of carriers or bandwidth parts, or statistical information of a plurality of terminals.

11. The method according to claim 10, wherein the positioning and related operation about surrounding environment sensing comprises at least one of the following:

performing positioning and surrounding environment sensing based on the first processing method;

sending the second sub-information or the third sub-information to a target device, wherein the target device is the first device entity or a second device entity; or performing positioning and related processing about surrounding environment sensing based on at least part of the result information.

12. The method according to claim 10, wherein the second sub-information further comprises measurement information of a target cell, and the measurement information comprises at least one of beam measurement information, channel measurement information, or RRM measurement information; or the second sub-information comprises information obtained by hiding an information feature of at least one measurement information of a target cell, and the target cell comprises at least one of a serving cell or a neighboring cell.

13. The method according to claim 10, wherein when the first information comprises an indication for requesting the second sub-information, the first information further comprises at least one of the following:

third sub-indication information that is used to indicate a manner for hiding the information feature; or fourth sub-indication information that is used to determine information content of the terminal related information.

14. The method according to claim 10, wherein the first processing method comprises a processing method performed by using a first neural network, and the first sub-information is used to indicate neural network related information of the first neural network.

15. The method according to claim 10, wherein the second device entity is used to provide a network service for the terminal, and the second device entity is a base station, a core network device, or another network element other than the base station and the core network device.

16. The method according to claim 10, wherein the first device entity comprises a set comprising one or at least two of the following: a base station, a location management function (LMF), a network data analytics function (NWDAF), a first network element, and a second network element, wherein the first network element is used to execute a network element of the second processing method, and the second network element is used for at least one of the following: collecting information required for performing the second processing method; or performing information calculation on information required for performing the second processing method.

17. A method for information processing, comprising:

sending, by a second device entity, first target information to a first device entity, wherein the first target information comprises second device entity related information or information obtained by performing second preset processing on the second device entity related information, and the first target information is used to determine first information sent by the first device entity to a terminal, wherein the first information is used to trigger the terminal to perform a positioning and related operation about surrounding environment sensing, and the first information comprises at least one of the following:

a first request, wherein the first request is used to indicate the terminal to perform the positioning and related operation about surrounding environment sensing based on a first processing method;

first sub-information for indicating the first processing method;

first assistance information used for the first processing method; or result information obtained by processing based on a second processing method, wherein the first assistance information meets one of the following:

the first assistance information is obtained by performing first preset processing on the first target information;

the first assistance information is the first target information; or when the terminal and the first device entity are authenticated through a preset interactive authentication process, the first assistance information is the first target information, wherein the first target information comprises second device entity related information or information obtained by performing second preset processing on the second device entity related information, and the second device entity related information comprises at least one of second device entity measurement information, second device entity implementation information, second device entity statistical information, information of the terminal in a corresponding carrier or bandwidth part, statistical information of a terminal in a plurality of carriers or bandwidth parts, or statistical information of a plurality of terminals.

18. The method according to claim 17, wherein the positioning and related operation about surrounding environment sensing comprises at least one of the following:

performing positioning and surrounding environment sensing based on the first processing method;

sending second sub-information or third sub-information to a target device, wherein the target device is the first device entity or a second device entity; or performing positioning and related processing about surrounding environment sensing based on at least part of the result information, wherein the second sub-information is terminal related information or information obtained by hiding an information feature of the terminal related information; and the third sub-information is used to update a third processing method.

* * * * *